(12) United States Patent
Iinuma et al.

(10) Patent No.: US 6,510,558 B1
(45) Date of Patent: Jan. 21, 2003

(54) DISCRIMINATION OF INFORMATION ACCESS METHODS

(75) Inventors: Shuichi Iinuma, Tokyo (JP); Kunihiro Hyakutake, Tokyo (JP)

(73) Assignee: Kabushiki Kaisha Infocity, Tokyo (JP)

( * ) Notice: Subject to any disclaimer, the term of this patent is extended or adjusted under 35 U.S.C. 154(b) by 0 days.

(21) Appl. No.: 09/090,661

(22) Filed: Jun. 4, 1998

(30) Foreign Application Priority Data

Jun. 6, 1997 (JP) .............................................. 9-149746

(51) Int. Cl.[7] .............................................. H04N 7/173
(52) U.S. Cl. ........................................ 725/113; 725/110
(58) Field of Search ............................ 725/35, 46, 136, 725/109–113, 4, 9; 348/478; 709/217, 236

(56) References Cited

U.S. PATENT DOCUMENTS

| | | | | |
|---|---|---|---|---|
| 5,247,575 A | * | 9/1993 | Sprague et al. ................ | 705/53 |
| 5,425,100 A | * | 6/1995 | Thomas et al. ................ | 725/20 |
| 5,778,181 A | * | 7/1998 | Hidary et al. ................ | 725/110 |
| 5,848,396 A | * | 12/1998 | Gerace ........................ | 705/10 |
| 5,880,769 A | * | 3/1999 | Nemirofsky et al. ........ | 725/139 |
| 5,905,865 A | * | 5/1999 | Palmer et al. ............... | 725/112 |
| 6,173,271 B1 | * | 1/2001 | Goodman et al. ............ | 705/40 |

OTHER PUBLICATIONS

Fielding, et al., "Hypertext Transfer Protocol—HTTP/1.1", Jan. 1997, 1.1, p. 131.*

* cited by examiner

Primary Examiner—Andrew Faile
Assistant Examiner—Andrew Y Koenig
(74) Attorney, Agent, or Firm—Notaro & Michalos P.C.

(57) ABSTRACT

A broadcast station 10 transmits a broadcast signal having content data and origin data both multiplexed thereto. An information access system 20 receives the broadcast signal, and extracts the content data and origin data. The content data includes for example a HTML file or a icon data. The information access system displays the content data and access to a WWW server 30 located on the internet using the display of the content data on the screen. While accessing the server, the information access server transfers the origin data to the server. The server stores the origin data and uses it immediately or later. The server discriminates the access using the content data multiplexed to the broadcast signal, from other types of access, using the origin data stored therein.

19 Claims, 12 Drawing Sheets

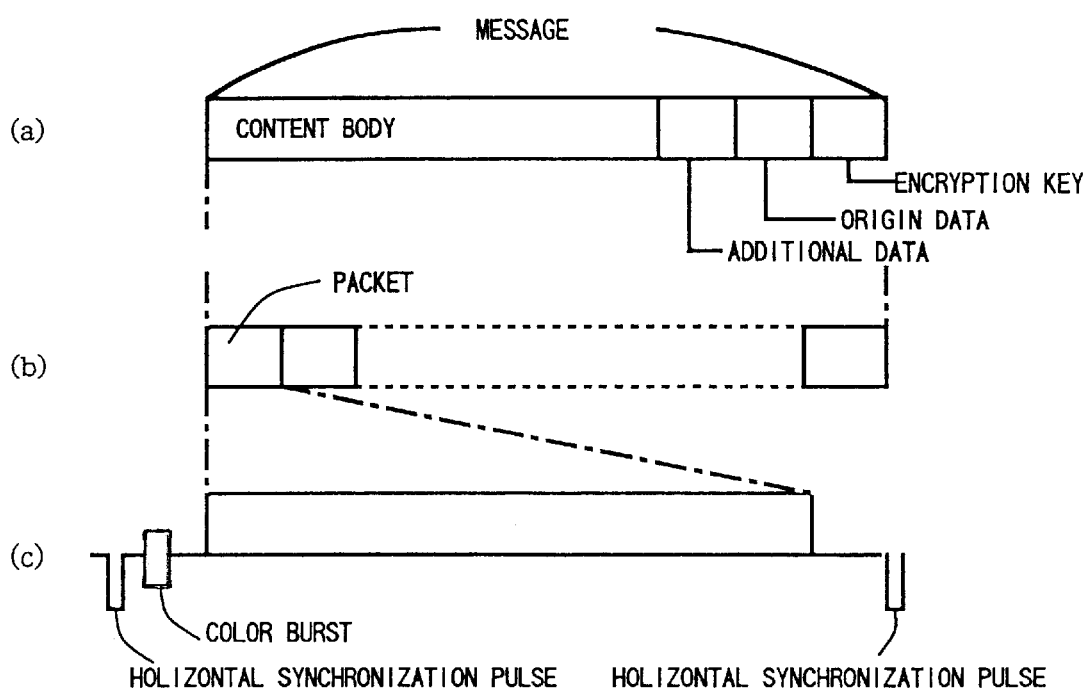
F I G. 3

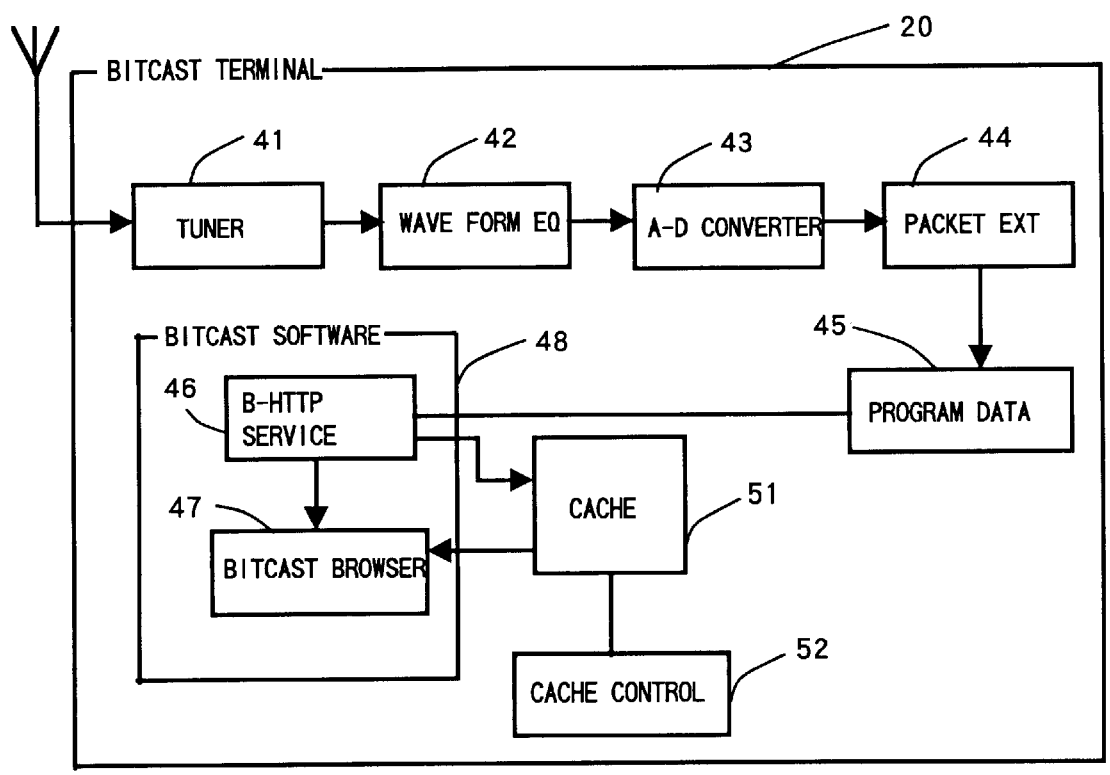
F I G. 4

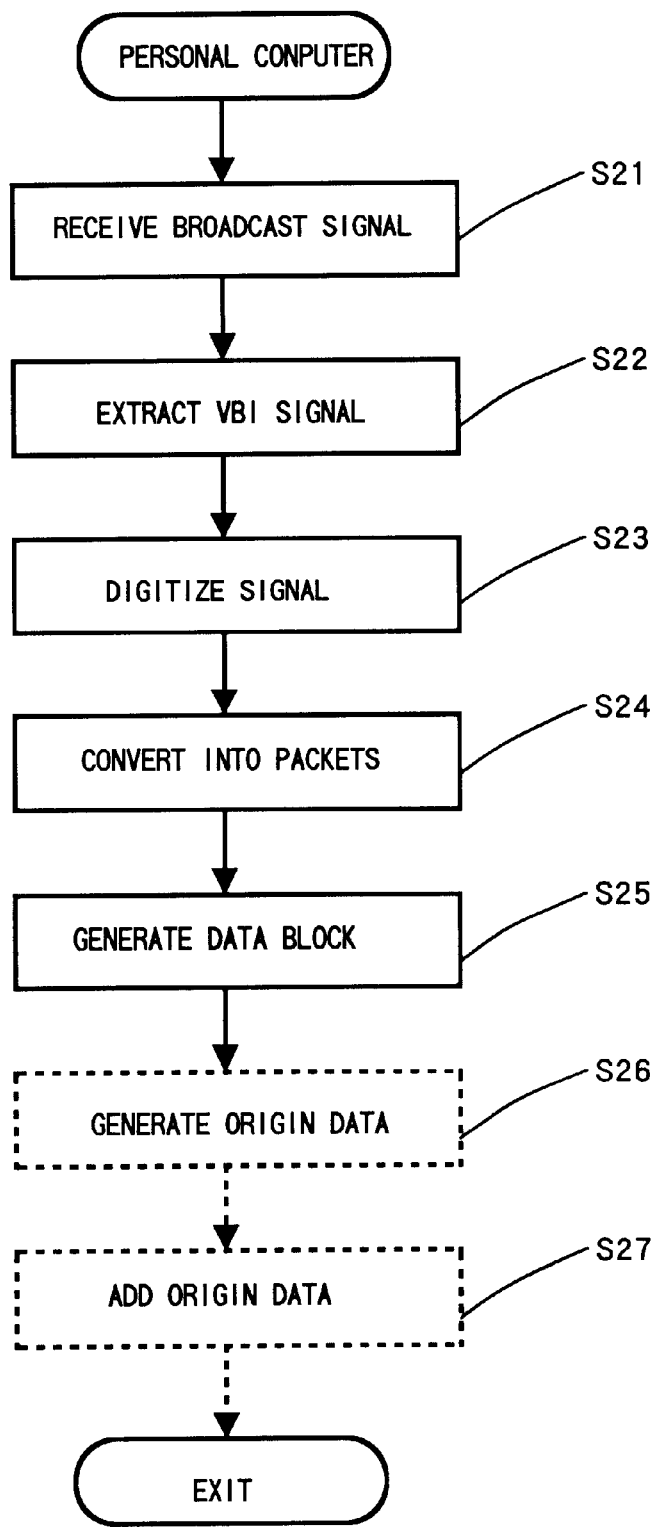
F I G. 5

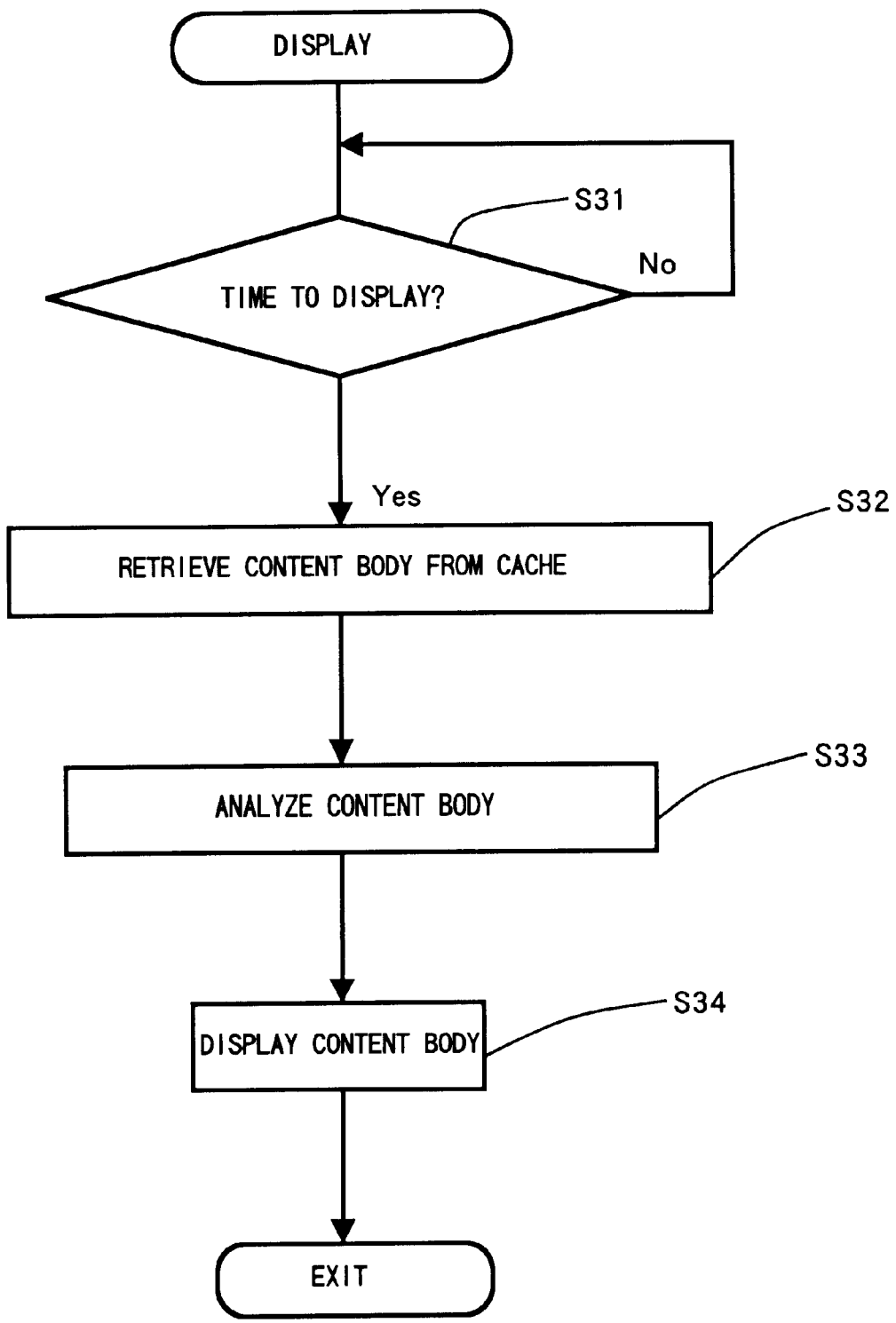
F I G. 6

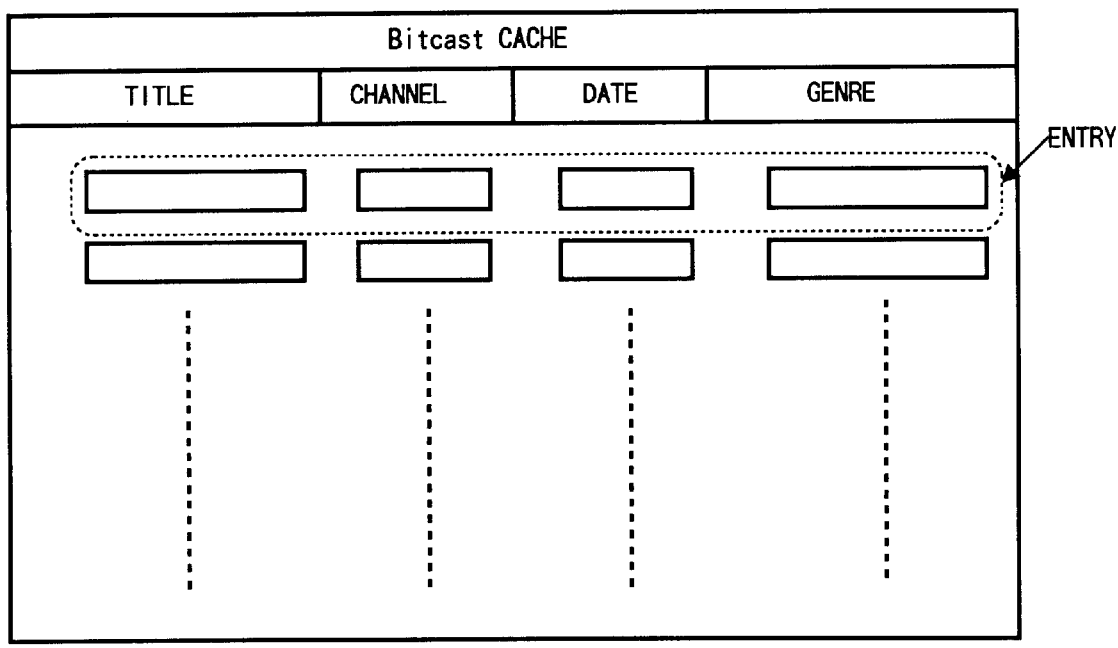
F I G. 8

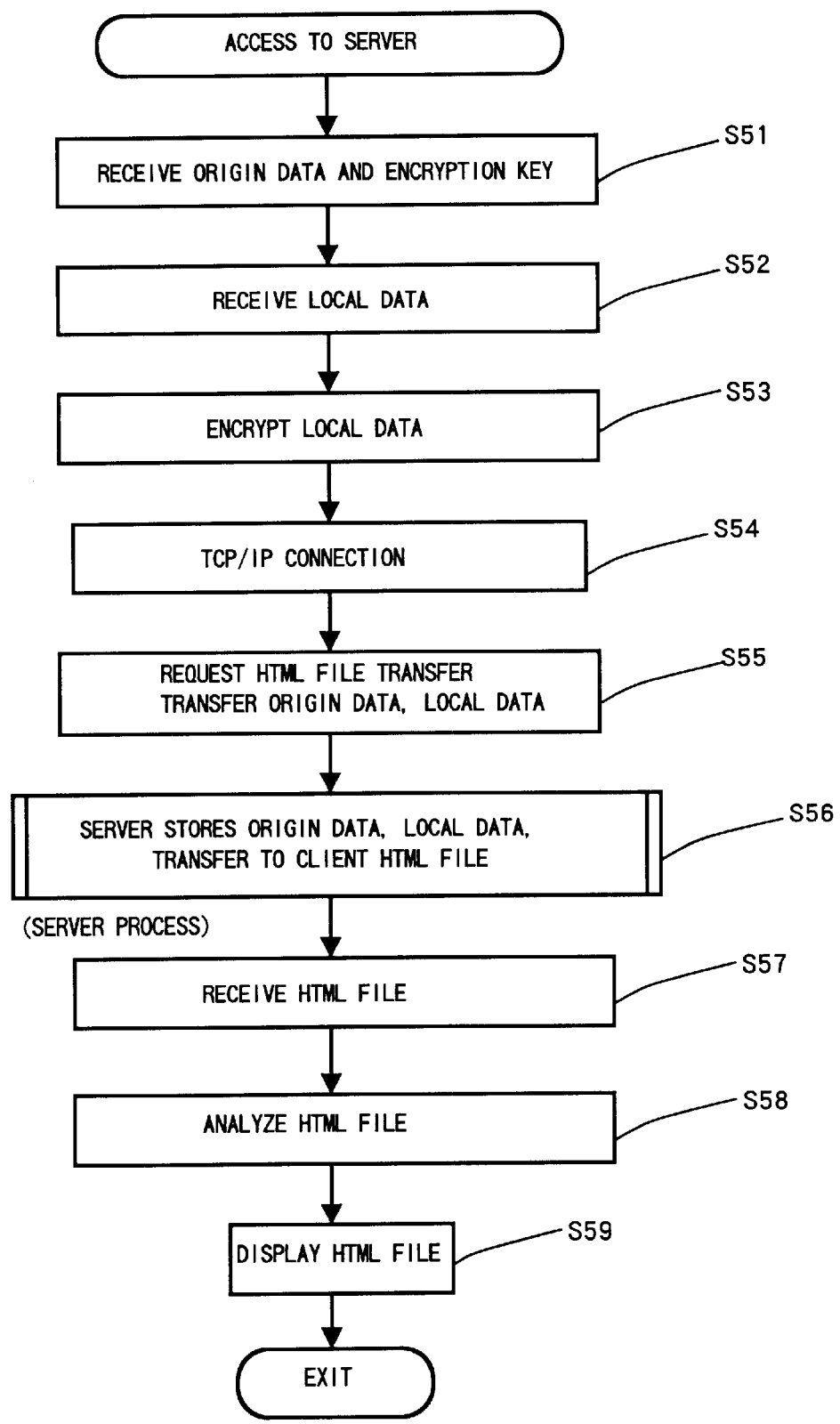
F I G. 10

DISCRIMINATION OF INFORMATION ACCESS METHODS

BACKGROUND OF THE INVENTION

This invention relates to an information access technology for accessing a computer system located on a global communication network (hereinafter, referred to as "the internet") using content data, for example, a HTML file obtained from a broadcast signal, for example, a television broadcast signal.

The assignee of the present application has proposed a technology wherein content data available in or related to the internet is multiplexed to a broadcast signal to reach a spread number of receivers. The content data is used at a receiver site to access information placed on the internet. (Japanese Patent Application H9-122683) According to that proposal, for example, web data and/or icon data is multiplexed to a television broadcast signal, and is displayed on a screen at a receiver site. A user performs a click operation at a reference area of the web data or at a icon area to make a TCP/IP connection for accessing a WWW (World-Wide Web) server and then easily obtains certain information.

By the way, it is desirable, for organizations, for example, traders who offer information services by WWW servers, to distinguish access to a server site through the multiplexed broadcast signal from usual kinds of access, and to measure a frequency at which the multiplexed broadcast signal is used for the access to the server site. Moreover, it is desirable to know what kind of people access the server site.

SUMMARY OF THE INVENTION

The purpose of the present invention is accordingly to enable to distinguish from usual access, the access to a server site using information propagated through a multiplexed broadcast signal.

According to one aspect of the present invention, to achieve the above-mentioned purpose, an information access method comprising the steps of: multiplexing content data and origin data to a broadcast signal; transmitting the multiplexed broadcast signal; receiving the multiplexed broadcast signal; extracting the content data and the origin data from the multiplexed broadcast signal thus received; accessing a computer system on a network using the extracted content data; and, while accessing the computer system, supplying the extracted origin data to the computer system on the network.

More specifically, a broadcast station transmits a broadcast signal having content data origin data both multiplexed thereto. An information access system receives the broadcast signal, and extracts the content data and origin data. The content data includes for example a HTML file or a icon data. The information access system displays the content data and access to a server for example WWW server located on the internet using the display of the content data on the screen. While accessing the server, the information access server transfers the origin data to the server. The server stores the origin data and uses it immediately or later. The server discriminates the access using the content data multiplexed to the broadcast signal, from other types of access, using the origin data stored therein.

In this aspect, the origin data is identification of the method of accessing the server, and can include at least one of a broadcast entity name, a broadcast program title, and broadcast time data in connection with the broadcast signal.

The origin data stored at the server can be retrieved later to analyze the access thereto.

The origin data can be converted into a protection state before the origin data is supplied to the computer system on the network. The conversion to the protection state is performed by encryption. The server should decrypt the encrypted data.

A computer program which is executed for accessing the computer system using the content data, can be designed to supply the origin data to the computer system. Alternatively, a computer program provided together with the content data, or provided by the computer system may supply the origin data to the computer system.

Information about the information access system can be transferred to the computer system. The information can be converted into a protection state before the information is supplied to the computer system on the network. The conversion to the protection state is performed by encryption. The server should decrypt the encrypted data. Protection information used for converting the information into the protection state can be multiplexed to the broadcast signal. The information about the information access system can be information about a user of the information access system.

According to another aspect of the present invention, to achieve the above-mentioned purpose, a broadcast system comprising: a means for multiplexing content data and origin data to a broadcast signal; and, a means for transmitting the multiplexed broadcast signal.

According to a still other aspect of the present invention, to achieve the above-mentioned purpose, a broadcast system comprising: a means for multiplexing content data, origin data and information about a protection method; and, a means for transmitting the multiplexed broadcast signal.

According to a still other aspect of the present invention, to achieve the above-mentioned purpose, an information access system comprising: a means for receiving a broadcast signal to which content data and origin data are multiplexed; a means for extracting the content data and the origin data from the received broadcast signal; a means for accessing a computer system on a network using the content data thus extracted; and, a means for supplying the origin data to the computer system on the network while accessing the computer system.

According to a still other aspect of the present invention, to achieve the above-mentioned purpose, an information access system comprising: a means for receiving a broadcast signal to which content data, origin data, and information about a protection method are multiplexed; a means for extracting the content data, the origin data, and the information about the protection method from the broadcast signal thus received; a means for accessing a computer system on a network using the content data; a means for converting information about the information access system into a protection state using the information about the protection method; and, a means for supplying the origin data and the information about the information access system to the computer system on the network while accessing the computer system, the information about the information access system being supplied to the computer system in the protection state.

According to a still other aspect of the present invention, to achieve the above-mentioned purpose, an information access system comprising: a means for receiving a broadcast signal including content data; a means for extracting the content data from the broadcast signal thus received; a means for generating origin data based on an operation state in which the broadcast signal is received; a means for accessing a computer system on a network using the content data; and, a means for supplying the origin data to the computer system on the network while accessing the computer system.

According to a still other aspect of the present invention, to achieve the above-mentioned purpose, an information access system comprising: a means for storing content data and origin data; a means for accessing a computer system on a network using the content data; and, a means for supplying the origin data to the computer system on the network while accessing the computer system.

According to a still other aspect of the present invention, to achieve the above-mentioned purpose, an information access system comprising: a means for storing content data and origin data; a means for storing information about the information computer system; a means for accessing a computer system on a network by using the content data; and, a means for supplying the origin data and the information about the information access system to the computer system on the network while accessing the computer network.

According to the present invention, the access to a server using such information transmitted by a broadcast signal or stored in a media for example a CD-ROM can discriminated from conventional access to the server.

The foregoing and other objects, features, aspects, and advantages of the present invention will become apparent from the following detailed description of the preferred embodiment, given by way of illustration and not of limitation with reference to the accompanying drawings, in which:

BRIEF DESCRIPTION OF THE DRAWING

FIG. 3 shows a schematic diagram illustrating the format of a message used in the embodiment.

FIG. 4 shows a block diagram of a computer system at a receiving site.

FIG. 5 shows a flow chart illustrating the receiving operation of at the receiving site.

FIG. 6 shows a flow chart illustrating the data display operation at the receiving site.

FIG. 8 shows a detailed appearance of a part of the displayed data of FIG. 7.

FIG. 10 shows a flow chart illustrating the access to a remote server from the receiving site.

DESCRIPTION OF THE PREFERRED EMBODIMENT

An embodiment of the information access system according to the present invention is described with reference to the attached drawing.

Figure 1:
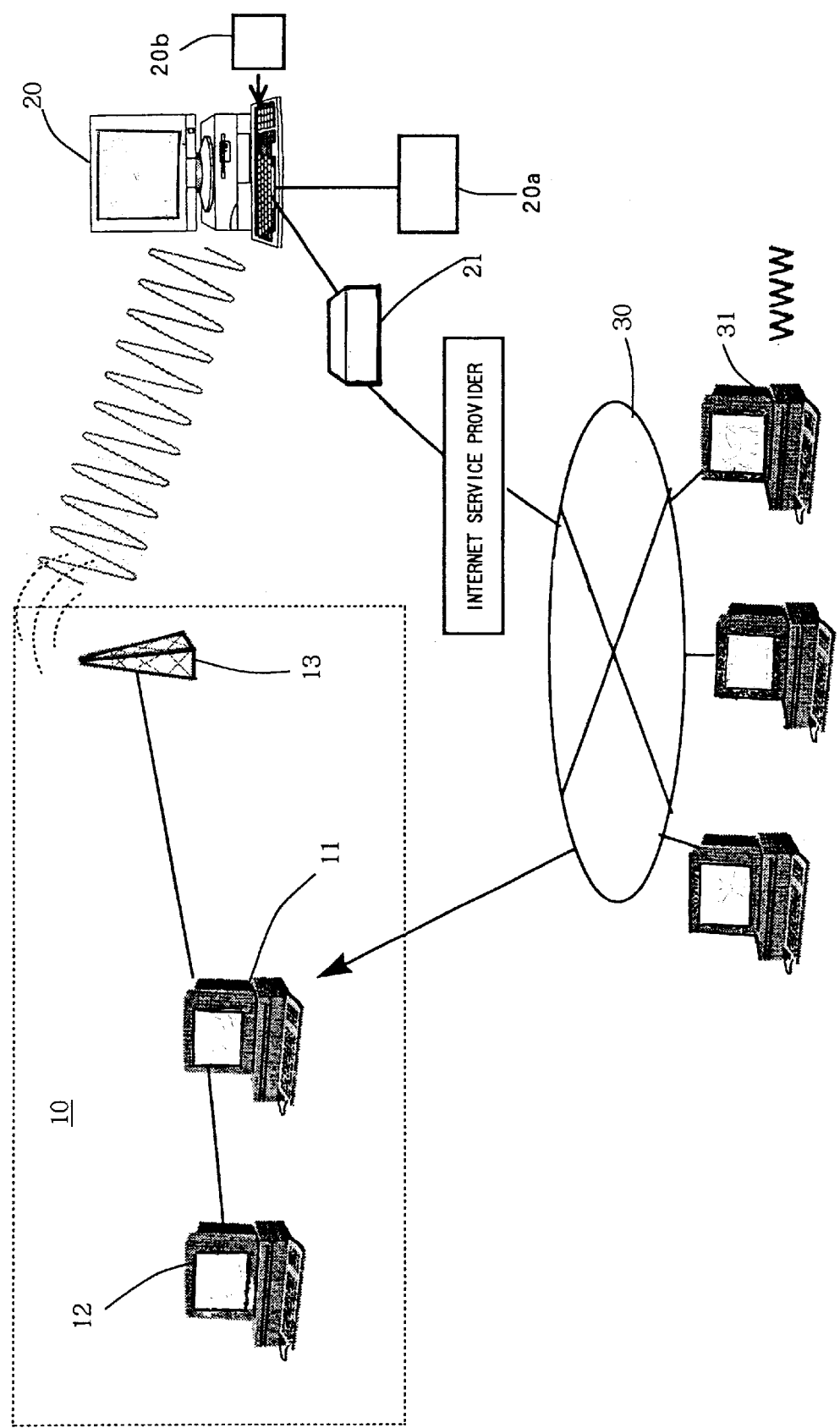
FIG. 1 illustrates information systems to which the present invention is applied.

FIG. 1 depicts the outline of a broadcast system and information processing system to which the preferred embodiment is applied, and in this figure a television station 10 is provided with a broadcast server 11, a content production terminal 11, transmission facilities 13, etc. A broadcast program prepared by the broadcast server 11 is broadcast through the transmission facilities 13. In this preferred embodiment, the transmission signal of the broadcast program has a usual television signal, and content data multiplexed to the television signal during vertical blanking interval. At a receiver site, the broadcasting signal is received through an antenna (not shown) etc., and demodulated with a television receiver or a personal computer etc. which has a television receiving function. In this figure, a personal computer 20 having a television receiving function is shown as one example. The personal computer 20 is capable of demodulation of the broadcast signal, and reproduces a television picture on at least one portion of a display screen based on the demodulated signal. The personal computer 20 is connected with a telephone line through a modem 21, which is then connected with the internet through an internet service provider. The personal computer 20 may be connected with the internet using a dedicated network. The internet has various types of servers connected thereto. In this figure, a WWW server 31 is connected to the network 30.

A storage media 20b such as a floppy disk, CD-ROM is used to install Bitcast software 48 (FIG. 4) into the personal computer 20, which is described later in detail. ("Bitcast" is a trademark of the assignee.) An equipment 20a can be a CD-ROM driver, a DVD (Digital Versatile Disk) driver or another type of data storage system, a tuner or a set top box for a satellite broadcast system or a cable TV system, which is provided to supply data to the personal computer 20.

In this embodiment, the broadcast station 10 receives web data (a web page) described in the HTML (Hyper-Text Markup Language) from a WWW server, multiplexes the web data to a broadcast signal of a usual broadcast program, and then broadcast the multiplexed broadcast signal. The web data can be modified by the content production terminal 12 before the web data is broadcast. New web data, which should be multiplexed to the broadcast signal, can be also produced at the content production terminal 12.

Figure 2:
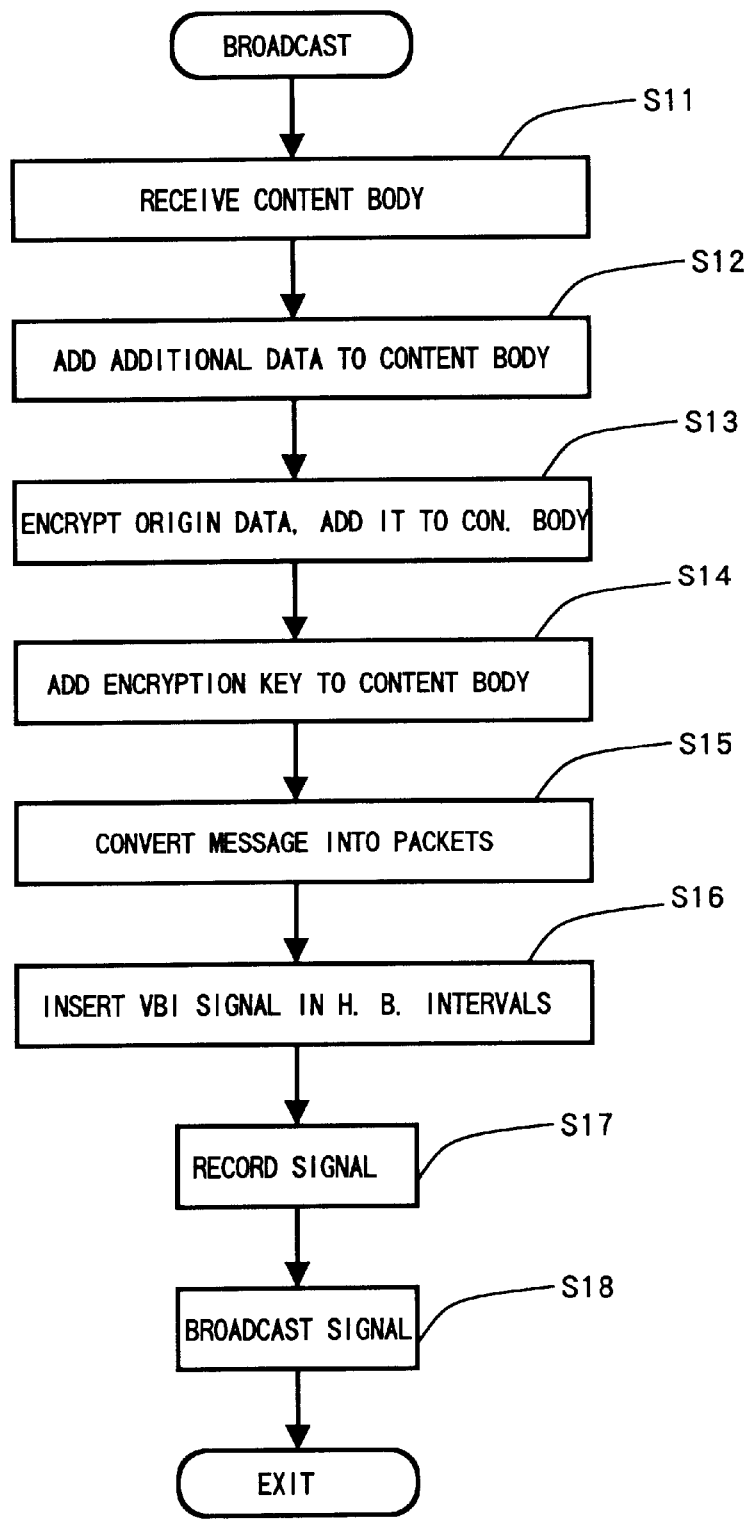
FIG. 2 shows a flow chart illustrating the transmission operation in the broadcasting station.

FIG. 2 illustrates the operation in the broadcast station 10, and, in this figure, a content body, or web data is prepared and provided by the content production terminal 12 or the like (S11). Next, additional data, for example, display time information is added to the content body (S12). Further, origin data, for example, the broadcast station name, the broadcast time, and the broadcast program title, etc. are obtained, encrypted, and then added to the content body (S13). The encryption can be performed for example with a public encryption key. In this case, the origin data can be either by a private key or public key of an encryption method. A conventional encryption key can be also used. Various types of protecting techniques can be adopted.

After that, an encryption key for encrypting local data is added to the content body (S14). The local data is information on the personal computer 20 which receives the broadcast signal, and it is, for example, the name, address, age, preference, etc. of the user of the personal computer 20. The encryption of the local data will be described later.

The combination of the content body and other additional data is referred to as a message (FIG. 3a). The message is divided into packets (S15, FIG. 3(b)), and each packet is converted to a VBI (Vertical Blanking Interval) signal and then multiplexed to a broadcast signal at any of certain horizontal blanking intervals during a vertical blanking interval (S16, FIG. 3(c)). The multiplexed broadcast signal, which can be recorded after multiplexing when required, is then broadcast (S17, S18).

FIG. 4 depicts the facilities implemented in the personal computer 20 for receiving and displaying a message, and in this figure, the personal computer 20 is configured with a television signal tuner 41, waveform equalizer 42, A-D converter 43, a packet extraction unit 44, a program data reproduction unit 44, a B-HTTP service unit 46 and a Bitcast browser unit 47, etc. In this embodiment, the B-HTTP service unit 46 and the Bitcast browser unit 47 are implemented with a software product 48 which is marketed by Infocity Co. with the trademark of "Bitcast".

The tuner 41 selects among the TV channels, and demodulates the transmitted and modulated television signal. The waveform equalizer 42 corrects distorted waveform of the television signal and the signal level thereof. The A-D conversion unit 43 samples the television signal during the certain horizontal blanking intervals at 1/364 fH second intervals (fH is horizontal scanning frequency), and generates digital data. The packet extraction unit 44 converts the digital data into packets, and performs transmission error detection/correction. The program reproduction unit 45 combines the packets to generate data blocks.

A plurality of data blocks are gathered into a data group (message).

The B-HTTP service unit 46 receives the messages from the program data reproduction unit 45, analyzes the messages and stores the messages in the cache 51 temporarily. The Bitcast browser unit 47 receives from the B-HTTP service unit 46 information about the contents of the cache 51, and in response to that information, upon display time, retrieves the corresponding message from the cache 51 and display that message on the display screen. The cache 51 is controlled by the cache control unit 52 in accordance with a predetermined rule.

FIG. 5 illustrates the procedure of receiving the content data, and in this figure, a broadcast signal is received (S21), the VBI signal placed at each vertical blanking interval is extracted (S22), and then the extracted signal is converted into digital data by the A-D converter 43 (S23). The digital data is converted into data packets by the packet extraction unit 44 (S24), and the data packets are further converted into data blocks by the program data reproduction unit 45 (S25). The B-HTTP service unit 46 saves the message in the cache 51 according to the additional data, which message consists of a group of data blocks. It should be noted that, as shown with dotted lines in FIG. 5, when a message does not carry origin data, origin data can be generated anew based on the tuning state of the tuner 41 (S26), and then added to the message (S27). The origin data generated anew can be, for example, a broadcast station name, a receiving time, a broadcast program title. The broadcast station name can be identified by the tuning state, and the receiving time can be determined with an internal timer. When a television program table is obtained in advance, the program title can be identified based on the current time and the tuning state.

Figure 7:
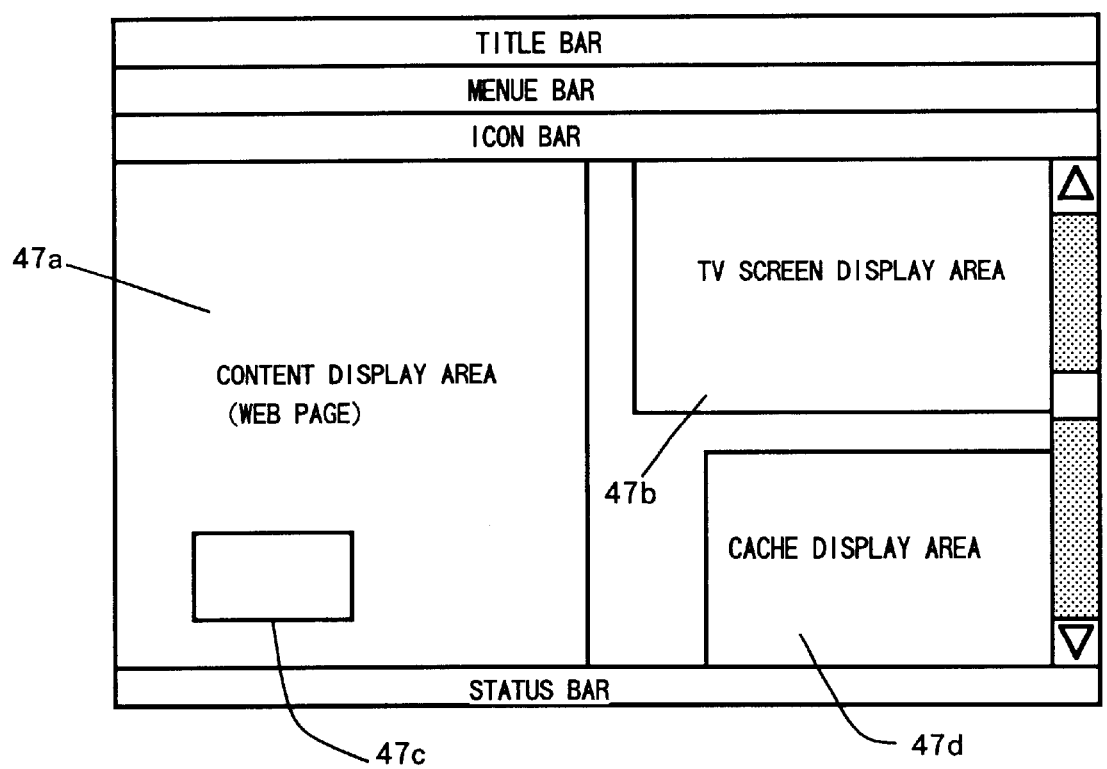
FIG. 7 shows an appearance of the displayed data.

FIG. 6 illustrates the procedure of displaying a message, and in this example, the message is displayed on the screen synchronous with the main broadcast program. In this case, the message contains additional information which indicates the display time besides the content body. In FIG. 6, each content body is read out from the cache 51 when the corresponding display time comes (S31, S32), and the content body is analyzed according to an HTML grammar to display the content body on the screen of the display device (S33, S34). The appearance of the display is as shown in FIG. 7, and the television program is displayed in the area 47b, and the content body is displayed in the area 47a. The content body is, for example, web data described in the HTML, and in response to receiving an event or click operation at the reference area 47c, information addressed by the anchor information buried at the reference area 47c is accessed. The location of the accessed information can be either locally or remotely in the internet. The location at the local site can be in a disk of a fixed disk drive, CD-ROM drive, DVD drive, etc.

The display appearance shown in FIG. 7 is one example, and the appearance can be changed by specification inputted by a user or based on additional data of the message.

As shown in FIG. 7, the display area 47d of the display screen lists the entries of contents stored in the cache 51. Each entry, as shown in FIG. 8, includes the name of the message, the channel, the date, and the genre, etc. Of course, only a part of these items can be displayed, and also other items can be displayed. Entries of the cache 51 are replaced according to any of various replacing rules by the cache control unit 52. More specifically, when the capacity of the cache 51 (for instance, 100 MB. The capacity can be designed to be set by the user) is consumed out, an entry having the lowest priority is deleted from cash 51 according to the predetermined rule (LRU etc.). The user can prevent one or more necessary messages or entries being deleted, by performing a click operation or the like at the corresponding entry location displayed in the area 47d. Of course, it is possible to change from a locked (deletion prohibited) state to an unlocked state. A predetermined mark is displayed at each locked entry to indicate the locked state thereof.

Figure 9:
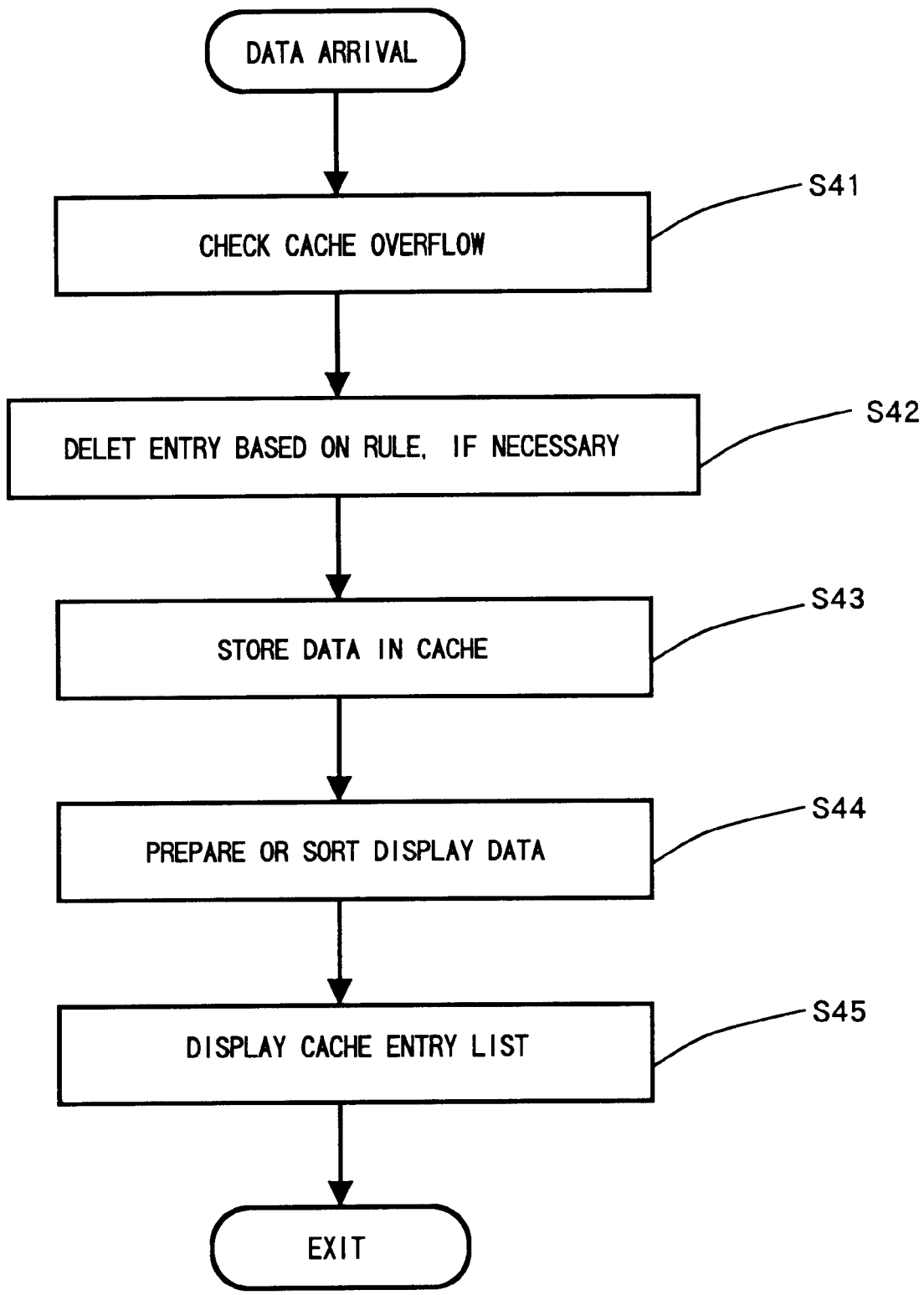
FIG. 9 shows a flow chart illustrating the operation of the cache control unit 52.

FIG. 9 illustrates the procedure performed by the cache control unit 52, and in this figure, when data is obtained for storing it in the cache 51, the capacity overflow of cache 51 is checked (S41). When the deletion of one or more entries is necessary as a result of the check on the capacity overflow, one or more entries are deleted from cache 51 in the predetermined order based on the rule (S42). The obtained data is then stored in the cache 51 (S43). And, the display data for the area 47d is prepared for example sorted, and displayed on the display area 47d (S44, S45).

FIG. 10 illustrates the procedure for identifying a server in the network using the corresponding anchor data. In. FIG. 10, before a location in the internet is identified using anchor data, origin data which can be encrypted one, and an encryption key are extracted from the message in which the anchor data is buried (S51). Next, local data on the personal computer 20 is obtained (S52). The local data is stored with the personal computer 20 as profile data of a plain text type. The local data is then encrypted by the encryption key of the message (S53). A TCP/IP connection is made using the modem 21 (S54). And, the transmission of information or an HTML file is requested to the server located at the IP address specified by the anchor data, and simultaneously the origin data and the local data are transmitted to the server (S55). The server stores the transmitted origin data and local data, and transmits the requested information to the personal computer (S56). ACGI (Common Gateway Interface) function can store the origin data and the local data and further perform other processes. The Bitcast browser unit 47 of the personal computer 20 receives the requested and transmitted information or HTML file, analyzes the information, and displays the information according to the analysis result (S57, S58, S59).

Figure 11:
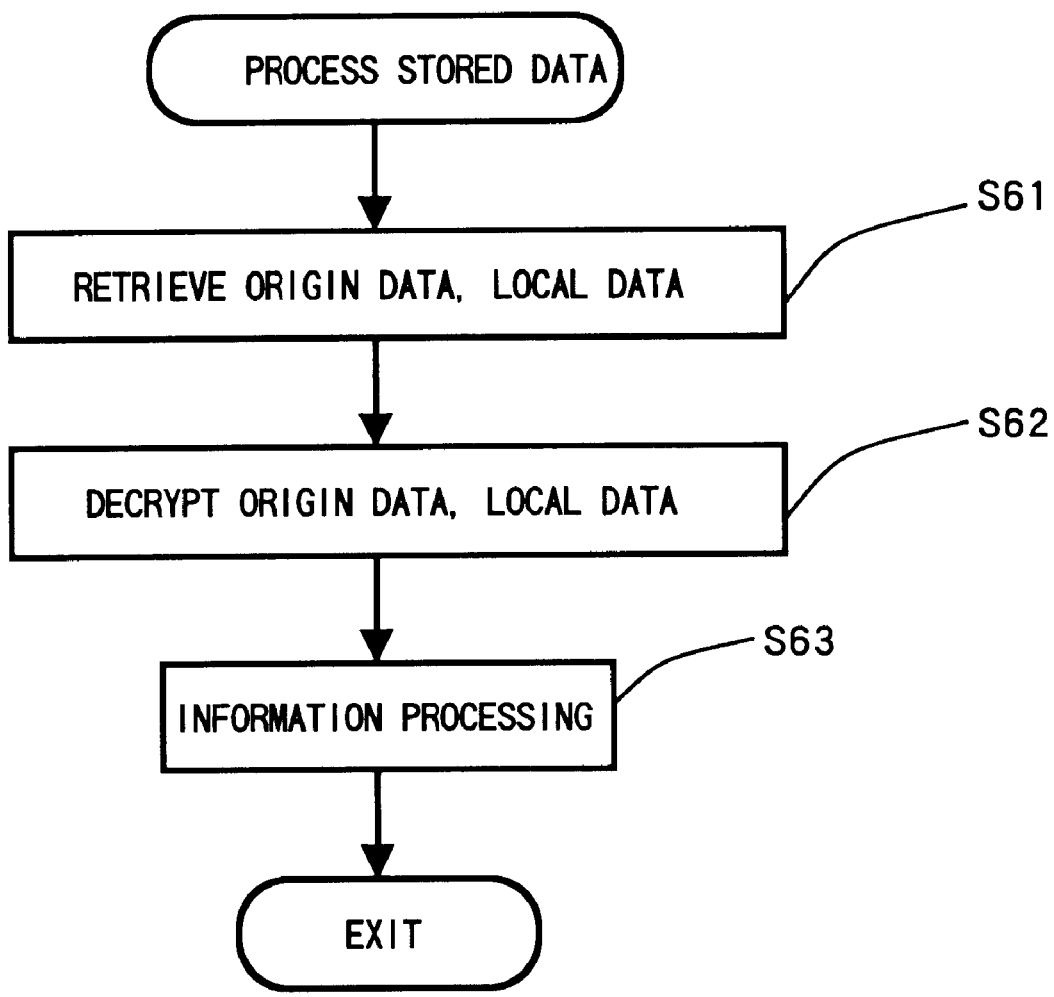
FIG. 11 shows a flow chart illustrating the operation using the origin data and local data kept in the server site.

FIG. 11 illustrates the procedure for processing the origin data and the local data stored in the server, and in this figure, the origin data and the local data are retrieved from a corresponding storage (S61). Next, the origin data and the local data are decrypted by a corresponding encryption key (S62). The origin data and the local data are then processed for example sorted to generate statistical information or user information (S63).

In a case where a public key of a public key encryption system is used to encrypt the local data or the origin data, only an encryption key administrator who manages secret keys can handle the origin data and local data. Because it is difficult in calculation respect to decrypt the origin data and the local data without the secret key. In this case, the administrator exclusively processes the data, or alternatively lends the server owner or a third party a security device so that the server owner or the third party can process the data.

When the key used for the encryption is a secret key (it is requested to protect the secret key), the server owner etc. can perform the decryption with a corresponding public key.

Figure 12:
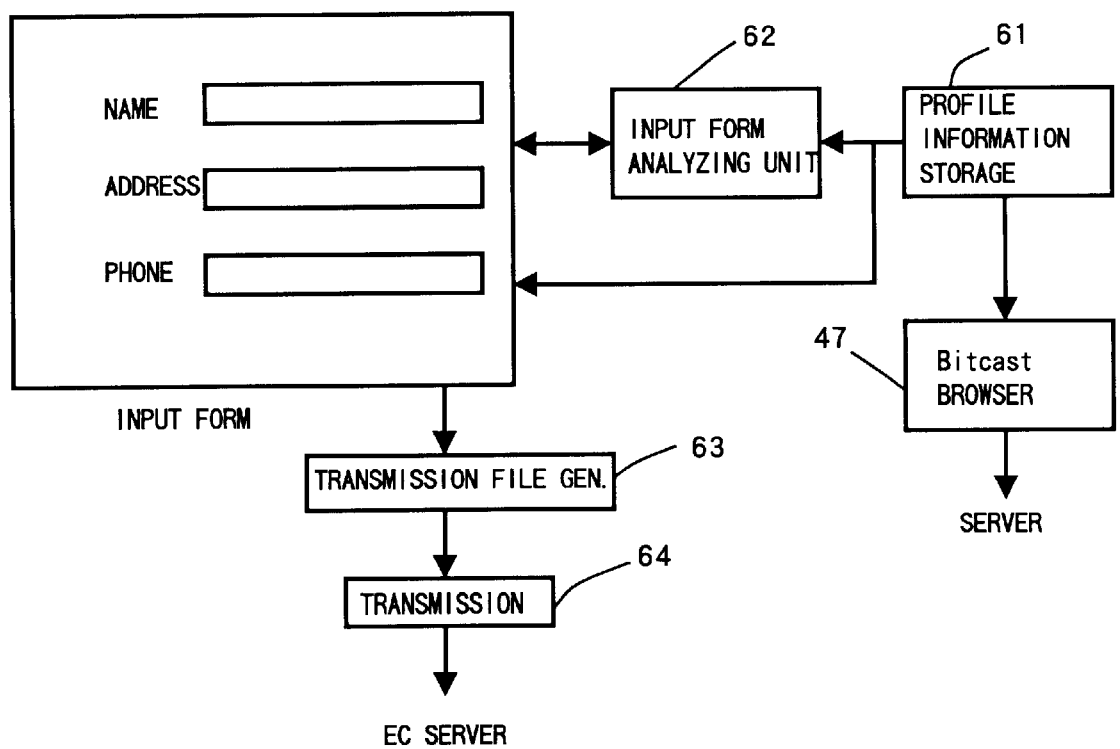
FIG. 12 is a diagram illustrating hot to use local data to generate a transmission file during electronic transaction.

Next, the local data is described. The system of the preferred embodiment is designed to receive the local data when the Bitcast software is installed into the personal computer 20. More specifically, upon installation, an input format is presented to the user, and the name and the address, etc. of the user can be inputted. The inputted information is kept as profile information in the profile information storage unit 61 (FIG. 12). And, when anchor data multiplexed to a broadcast signal is used to access a remote server, that profile information is automatically transferred to the remote server site through the browser 47.

Moreover, the profile information can be used while an electronic business transaction or an electronic payment is performed through the internet. Conventionally, the name, the address, and the credit card number, etc. of a trader are inputted using a input form on the web page as shown in FIG. 12 and the key board, for the electronic transaction on the internet. The transmission file generation unit 63, based on the inputted information, generates a transmission file which consists of attributes and attribute values, and the transmission unit 64 transmits the transmission file to an electronic commerce server. In this embodiment, the use of the profile information stored in the profile information storage unit 61 saves time for inputting data conventionally required. It is desirable to design the web data multiplexed to the broadcast signal to have a uniform data structure such as to accept the profile information easily. The input form analyzing unit 62 can recognize characters or the like close by an input format, for example, a form or input field of an HTML file to automatically input corresponding profile information units at the format area even when the data structure is different from each other. More specifically, the input form analyzing unit 62 retrieves the corresponding data from the profile information storage unit 61 based on the analysis result, and generates a transmission file which conforms to the input form, and then transmits the user information to the server.

While the present invention has been described in conjunction with the preferred embodiment thereof, such description is for illustrative purpose only, and it will be understood that the above description of the invention is susceptible to various modifications, changes, and adaptations, and the same are intended to be comprehended within the meaning and the rage equivalents of the appended claims.

For example, only the origin data or only the local data can be transferred to the server site. The personal computer 20 can have a function to encrypt the origin data multiplexed to the broadcast signal even in a plain text. Moreover, various protecting techniques and combinations of various protecting techniques can be adopted for encryption of the origin data or the local data.

Moreover, a JAVA (a trademark of Sun Microsystems, Inc.) applet, an active X (a trademark of Microsoft Corp.) or other program executing function can be transferred to a user site through the broadcast multiplexing or another channel to transmit the origin data to the server site. Even the server to be accessed can transfer such a function to the personal computer 20.

Further, the origin data can be one transmitted by multiplexing to the broadcast signal, or one obtained from the tuner and timer. The content data and other data can be multiplexing to a radio broadcast signal, or other broadcast signal instead of the television broadcast signal. Not only a ground wave broadcast signal but also a cable broadcast signal, and a satellite broadcast signal can be used. The broadcast signal can carry the content data as a main broadcast program or communicated data. The dedicated set top box (20a in FIG. 1) can be used in a case of a cable broadcast, a satellite broadcast, or a data communication broadcast. Of course, the function of the set top box can be implemented in the personal computer 20.

Still further, the present invention is applicable to a case where content data is stored in a CD-ROM, DVD, or the like media. More specifically, the content data is read out from the media by the corresponding driver system (21a in FIG. 1) to access to a server on the network. The information access system according to the present invention is designed to provide the server, with origin data, for example, publication data stored in the storage media for the same purpose. According to this configuration, information about the access to the server using a storage media can be obtained.

Finally, the cache control technique and user information input technique related to the present invention will be described in brief.

The cache control system illustrated with the description of the embodiment comprises: a means for receiving an entry to be temporarily stored, and writing in the entry; a means for deleting a stored entry based on a predetermined rule; a means for displaying information on stored entries in the storage means; and a means for locking one or more entries in a locked state by specifying the one or more entries.

In this configuration, for example, stream data which is difficult to obtain again can be protected by setting it in the locked state.

Further, the user information input system illustrated with the description of the preferred embodiment comprises a storage means for storing user information; a means for presenting to a user a user-interface to receive the user information; a means for generating transmission data based on the inputted user information through the user-interface; and a means for analyzing the user-interface to generate the transmission data from the user information store in the storage means.

In this configuration, the stored user information can be used even when the input format is different from each other, and then time for inputting the user information can be saved.

What is claimed is:
1. An information access method comprising the steps of:
at a broadcaster site, multiplexing content data and origin data to a broadcast signal, the origin data being com- bined to the content data and including at least one of a broadcast entity identifier, a broadcast program identifier, and broadcast time data in connection with the broadcast signal;

at the broadcaster site, transmitting the multiplexed broadcast signal;

at an information access system, receiving the multiplexed broadcast signal;

at the information access system, extracting the content data and the origin data from the multiplexed broadcast signal thus received;

at the information access system, accessing a computer system on a network using the extracted content data; and, at the information access system, while accessing the computer system, supplying the extracted origin data to the computer system on the network.

2. An information access method as claimed in claim 1, further comprising the step of retrieving the origin data stored at the computer system on the network.

3. An information access method as claimed in claim 1, wherein the origin data is converted into a protection state before the origin data is supplied to the computer system on the network.

4. An information access method as claimed in claim 3, wherein the conversion to the protection state is performed by encryption.

5. An information access method as claimed in claim 4, further comprising the step of decrypting the extracted origin data.

6. An information access method as claimed in claim 1, wherein the origin data is supplied to the computer system on the network by a computer program which is executed at the information access system for accessing the computer system using the content data.

7. An information access method as claimed in claim 1, wherein the origin data is supplied to the computer system on the network by a computer program provided together with the content data.

8. An-information access method as claimed in claim 1, further comprising the step of supplying to the computer system on the network, information about information access system used for accessing the computer system.

9. An information access method as claimed in claim 8, wherein the information about the information access system is information about a user of the information access system.

10. An information access method as claimed in claim 8, wherein the information about the information access system is converted into a protection state before the information thereof is supplied to the computer system on the network.

11. An information access method as claimed in claim 10, wherein protection information used for converting the information about the information access system into the protection state is multiplexed to the broadcast signal.

12. An information access method as claimed in claim 10, the conversion into the protection state is performed by encryption.

13. An information access system comprising:

means for receiving a broadcast signal to which content data and origin data are multiplexed, the origin data being combined to the content data and including at least one of a broadcast entity identifier, a broadcast program identifier, and broadcast time data in connection with the broadcast signal;

means for extracting the content data and the origin data from the received broadcast signal;

means for accessing a computer system on a network using the content data thus extracted; and means for supplying the origin data to the computer system on the network while accessing the computer system.

14. An information access system as claimed in claim 13, wherein information about the information access system is supplied to the computer system on the network while accessing the computer system.

15. An information access system as claimed claim 13, wherein the origin data is in a protection state.

16. An information access system as claimed in claim 13, wherein the information about the information access system is in a protection state.

17. An information access system comprising:

means for receiving a broadcast signal to which content data, origin data, and information about a protection method are multiplexed, the origin data being combined to the content data and including at least one of a broadcast entity identifier, a broadcast program identifier, and broadcast time data in connection with the broadcast signal;

means for extracting the content data, the origin data, and the information about the protection method from the broadcast signal thus received;

means for accessing a computer system on a network using the content data;

means for converting information about the information access system into a protection state using the information about the protection method; and means for supplying the origin data and the information about the information access system to the computer system on the network while accessing the computer system, the information about the information access system being supplied to the computer system in the protection state.

18. An information access system comprising:

means for receiving a broadcast signal including content data;

means for extracting the content data from the broadcast signal thus received;

means for generating origin data based on an operation state in which the broadcast signal is received, the origin data including at least one of a broadcast entity identifier, a broadcast program identifier, and broadcast time data in connection with the broadcast signal;

means for accessing a computer system on a network using the content data; and means for supplying the origin data to the computer system on the network while accessing the computer system.

19. A computer program product for accessing a computer system executing the steps of:

receiving a broadcast signal including content data and origin, the origin data being combined to the content data and including at least one of a broadcast entity identifier, a broadcast program identifier, and broadcast time data in connection with the broadcast signal;

extracting the content data and the origin data from the broadcast signal thus received;

accessing a computer system on a network using the content data thus extracted; and supplying the origin data to the computer system on the network while accessing the computer system.

* * * * *